Nov. 24, 1959 L. R. JACOBSEN 2,914,622
VOLTAGE EXPANDER CIRCUITS OR THE LIKE
Filed Feb. 2, 1955
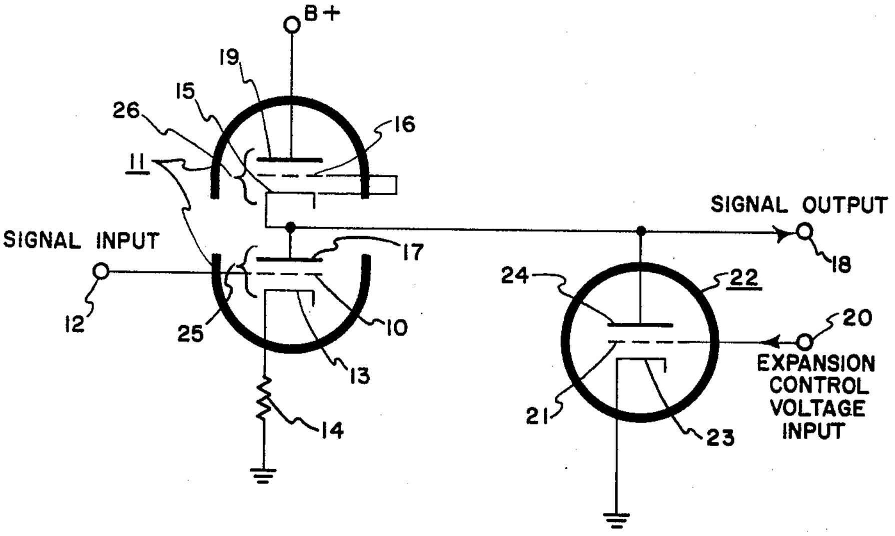
LANCE R. JACOBSEN
*INVENTOR.*
*BY* Bruce L Birchard
HIS ATTORNEY

United States Patent Office 2,914,622
Patented Nov. 24, 1959

2,914,622

VOLTAGE EXPANDER CIRCUITS OR THE LIKE

Lance R. Jacobsen, Lynwood, Calif., assignor to Hoffman Electronics Corporation, a corporation of California Application February 2, 1955, Serial No. 485,791

3 Claims. (Cl. 179—171)

This invention is related to voltage expander circuits for expanding the amplitudes of either A.C. or D.C. signal voltages, and, more particularly, to an improved voltage expander which will exhibit a linear characteristic and which may be constructed with a minimum of components.

Voltage compressor and expander circuits are most frequently associated with the production and reproduction of orchestral music. The volume range of an orchestral performance may be as high as 75 db or more. FM broadcast facilities, on the other hand, are usually limited in volume range to about 60 db. The volume range of AM transmitters is usually much less, i.e., between 30 and 50 db. Conventional lateral groove shellac records are generally limited in volume range to about 30 db. As a result of the limitation of transmitting and recording media, the music to be transmitted or recorded must undergo a degree of volume range reduction. Compressor circuits perform this reduction function.

If reproduced music is to have the same volume range as in its original form, some kind of a volume expander is required in the listener's audio amplifier.

The desirable characteristics which a voltage or volume expander should have are: negligible distortion, controllable degree of expansion, no audible thump or transient distortion, and an expansion characteristic revealing a small degree of expansion at low output levels the amount of expansion steadily increasing all the way to maximum power output.

Volume expansion circuits may be divided into two groups, those in which the control voltage is derived from the output signal voltage, and those in which it is derived from the input signal voltage, suitably amplified. Circuits of the former type are less expensive and employ fewer vacuum tubes than the latter, but however have a less desirable shape of expansion characteristic and may exhibit instability. Many circuits of the latter type have been developed and rather satisfactory results have been derived therefrom. However, circuits even of the latter type do exhibit some degree of distortion, not too high signal-to-thump ratios, and considerable circuitry.

Therefore, it is an object of the present invention to provide a new and useful voltage expander.

It is a further object of the present invention to provide a new and useful voltage expander which will exhibit a linear response, absence of thump and transient noise, and will preserve simplicity of circuit design.

According to the present invention, three electrode discharge devices are connected in series-parallel. One of the parallel-connected devices is driven by an input signal voltage. The remaining parallel-connected device is driven by a controllable pulsating bias voltage the instantaneous magnitude of which is proportional to the magnitude of the input signal. The current drain of the aforementioned series-parallel circuit is constant at all times. Variations in the magnitude of the input signal will be accompanied solely by proportional variations in the shunt internal resistance of the parallel-connected devices and the consequent expanded variations in output signal voltage.

The features of the present invention which are believed to be novel are set forth with particularity in the appended claims. The present invention, both as to its organization and manner of operation, together with further objects and advantages thereof, may best be understood by reference to the following description, taken in connnection with the accompanying drawing, in which:

The sole figure is a schematic diagram of a voltage expander circuit according to the present invention.

In the sole figure control electrode 10 of duo-triode vacuum tube 11 is coupled to input terminal 12 which is adapted for coupling to an input signal source 27. Cathode 13 of vacuum tube 11 is coupled through cathode resistor 14 to ground. Cathode 15 is directly connected to associated control electrode 16 and also to anode 17 and output terminal 18. Anode 19 is directly connected to a source of positive voltage (B+). Expansion control voltage input terminal 20 is connected to control electrode 21 of vacuum tube 22. Cathode 23 of vacuum tube 22 is connected directly to ground. Anode 24 of vacuum tube 22 is connected to the junction of control electrode 16, cathode 15, anode 17 and output terminal 18. Negative, expansion, control voltage is supplied by the circuit combination of input divider 28, amplifier 29, rectifier 30, filter 31, and variable voltage deriving load network 32.

The circuit shown in the sole figure operates as follows. The input signal voltage applied to input terminal 12 may be either an A.C. voltage or a pulsating D.C. voltage. The expansion control input voltage is obtained in a conventional manner, e.g., by tapping off a portion of the input signal voltage, feeding this portion through the side-chain amplifier, full-wave rectifier, and load network shown, and applying the resultant constant or pulsating D.C. bias voltage, in negative polarity, to terminal 20. The anode resistance of vacuum tube 22 should be of relatively low value, e.g., 6,000 to 8,000 ohms. Each triode portion of duo-triode vacuum tube 11, however, should exhibit rather high anode resistances, e.g., of the order of 60,000 to 80,000 ohms. Vacuum tube 11 in conjunction with cathode resistor 14 comprises a constant current amplifier (more fully described in a co-pending application entitled "Amplifier Circuits or the Like," filed January 27, 1955, Serial No. 484,506) which acts as an electronic voltage divider, the anode resistance of triode portion 25 of vacuum tube 11 varying inversely with respect to the input signal and the anode resistance of triode portion 26. Cathode resistor 14 serves in three capacities, as a current limiting resistor, a bias resistor, and an input impedance. Conceivably resistor 14 may be eliminated from the circuit, so far as the first two functions are concerned, should the tube manufacturers' data regarding permissible anode current permit. The side-chain amplifier, rectifier, and filter circuitry may be designed to provide a pulsating negative bias voltage for application to input terminal 20 should same degree of plate modulation be desired. When the negative grid bias voltage applied to terminal 20 is at its minimum value, the anode resistance of vacuum tube 22 will be low. As the expansion negative bias voltage is increased, the anode resistance of vacuum tube 22 will increase, thereby increasing the shunt resistance across triode portion 25 of vacuum tube 11. This increase in resistance permits a higher signal voltage to be developed across triode portion 25 and triode vacuum tube 22. This increase in shunt resistance effectuates a decrease in the resistance of triode portion 26 and subsequently provides for an increased anode voltage to triode portion 25 and also to vacuum tube 22. This increase in the anode voltage to triode portion 25 and vacuum tube 22 is accompanied by a resultant increase in amplification of the input signal.

It is apparent that the expanded amplification is the result of varying tube resistances and not because of the change in tube current, since it is recalled that the overall instantaneous current drain of the series-parallel circuit will be relatively constant.

It might seem that duo-triode portion 26 could be replaced by a simple diode. Experiment has shown, however, that if a diode is employed, the constant current characteristic and the linearity of the expansion characteristic attributed thereto will be destroyed.

From the foregoing, it is apparent that the novelty of the present invention resides in a remarkably linear expansion characteristic, a minimum of circuit components, a reduction of tube reactances to a minimum by virtue of the constant-current feature of the circuit, and by simplicity of design. Further, the signal-to-thump ratio is remarkably high, owing to the fact that by virtue of the constant-current feature sudden surges of current corresponding to sudden changes in input signal amplitude are avoided.

It may also be noticed that output terminal 18 may be directly coupled to the input circuit of the succeeding stage, to avoid the effects of transients on the succeeding stages as is presently experienced in the conventional voltage expanders.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. In combination, a signal source, means coupled to the signal source for deriving a negative control voltage, first, second, and third vacuum tubes each having a control electrode, an anode, and a cathode, said control electrode of said first vacuum tube being coupled to said signal source, means for applying the negative voltage to the control electrode of said second vacuum tube, said anode of said second vacuum tube being connected to said anode of said first vacuum tube and said cathode of said third vacuum tube, said cathode of said second vacuum tube being maintained at a reference potential, said cathode of said first vacuum tube being coupled to said reference potential, said control electrode and cathode of said third vacuum tube being interconnected, and said anode of said third vacuum tube being maintained at a positive reference potential.

2. In combination, a signal source, means coupled to the signal source for deriving a rectified, direct current negative bias voltage, first, second, and third vacuum tubes each having a control electrode, an anode and a cathode, said control electrode of said first vacuum tube being coupled to said signal source, said control electrode of said second vacuum tube being coupled to said negative voltage, said anode of said second vacuum tube being connected to said anode of said first vacuum tube and said cathode of said third vacuum tube, said cathode of said second vacuum tube being maintained at a reference potential, said cathode of said first vacuum tube being coupled to said reference potential, said control electrode and cathode of said third vacuum tube being interconnected, and said anode of said third vacuum tube being maintained at a positive reference potential.

3. Apparatus according to claim 1 in which said first vacuum tube is provided with a cathode resistor.

References Cited in the file of this patent

UNITED STATES PATENTS

| | | |
|---|---|---|
| 2,307,308 | Sorensen | Jan. 5, 1943 |
| 2,363,985 | Moser | Nov. 28, 1944 |
| 2,431,973 | White | Dec. 2, 1947 |
| 2,544,340 | Maxwell | Mar. 6, 1951 |
| 2,763,733 | Coulter | Sept. 18, 1956 |

FOREIGN PATENTS

| | | |
|---|---|---|
| 688,273 | Great Britain | Mar. 4, 1953 |

OTHER REFERENCES

General Radio Experimenter, vol. 26, No. 5, October 1951, pp. 1–7 (copyright 1951 General Radio Co., Cambridge, Mass., U.S.A.).

"Electronics," March 1950, "Tubes at Work," page 116 (vol. 123, No. 3).